US008095139B2

(12) United States Patent
Marinier (10) Patent No.: US 8,095,139 B2
(45) Date of Patent: Jan. 10, 2012

(54) WIRELESS COMMUNICATION METHOD AND APPARATUS FOR ASSIGNING CELL AND RESOURCE BLOCKS

(75) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 1119 days.

(21) Appl. No.: 11/853,091

(22) Filed: Sep. 11, 2007

(65) Prior Publication Data

US 2008/0068981 A1 Mar. 20, 2008

Related U.S. Application Data

(60) Provisional application No. 60/844,428, filed on Sep. 14, 2006.

(51) Int. Cl.
*H04W 40/00* (2009.01)
(52) U.S. Cl. .......................... 455/446; 455/447; 455/448
(58) Field of Classification Search .................... 455/446
See application file for complete search history.

(56) References Cited

U.S. PATENT DOCUMENTS

| 6,067,455 | A | 5/2000 | Endo et al. |
| 6,498,934 | B1* | 12/2002 | Muller ........................... 455/450 |
| 6,904,283 | B2 | 6/2005 | Li et al. |
| 7,650,150 | B1* | 1/2010 | Gerakoulis et al. ........... 455/450 |
| 7,877,108 | B2* | 1/2011 | Wengerter et al. ............ 455/522 |
| 2004/0141473 | A1 | 7/2004 | Buot |
| 2005/0009532 | A1 | 1/2005 | Cuffaro et al. |
| 2005/0120109 | A1 | 6/2005 | Delic et al. |
| 2005/0272433 | A1* | 12/2005 | Won et al. ...................... 455/449 |
| 2006/0092881 | A1* | 5/2006 | Laroia et al. ................... 370/331 |
| 2006/0094363 | A1* | 5/2006 | Kang et al. .................... 455/63.1 |
| 2006/0194546 | A1 | 8/2006 | Gunnarsson et al. |
| 2007/0042784 | A1* | 2/2007 | Anderson ....................... 455/450 |
| 2007/0109999 | A1* | 5/2007 | Brunner ......................... 370/331 |
| 2007/0167191 | A1* | 7/2007 | Carlsson ..................... 455/562.1 |
| 2007/0173261 | A1* | 7/2007 | Priotti et al. ................... 455/450 |
| 2008/0057932 | A1* | 3/2008 | Brunner ..................... 455/422.1 |

(Continued)

FOREIGN PATENT DOCUMENTS

GB 2 313 742 12/1997

(Continued)

OTHER PUBLICATIONS

3GPP, *3rd Generation Partnership Project; Technical Specification Group Radio Access Network; Physical Layer Aspects For Evolved Universal Terrestrial Radio Access (UTRA) (Release 7)*, 3GPP TR 25.814 V7.0.0 (Jun. 2006).

(Continued)

*Primary Examiner* — Kamran Afshar
*Assistant Examiner* — Sayed T Zewari
(74) *Attorney, Agent, or Firm* — Volpe and Koenig, P.C.

(57) ABSTRACT

A method and apparatus for assigning cell and resource blocks to a wireless transmit/receive units (WTRU) in a wireless communication system including a resource management unit and a plurality of cells having resource blocks are disclosed. The WTRU is currently associated with a particular one of the cells. Path losses between the WTRU and cells neighboring the particular cell are determined. The average level of inter-cell interference on each resource block at each cell neighboring the particular cell is then determined. A signal-to-interference ratio (SIR) is then determined to support a guaranteed bit rate of the WTRU on an uplink.

29 Claims, 3 Drawing Sheets

U.S. PATENT DOCUMENTS

| | | | |
|---|---|---|---|
| 2008/0076432 A1* | 3/2008 | Senarath et al. | 455/442 |
| 2008/0214197 A1* | 9/2008 | Englund et al. | 455/450 |
| 2009/0054060 A1* | 2/2009 | Jones | 455/434 |

FOREIGN PATENT DOCUMENTS

| | | |
|---|---|---|
| WO | 2005/046283 | 5/2005 |
| WO | 2005/120109 | 12/2005 |
| WO | 2006/034578 | 4/2006 |
| WO | 2006/086788 | 8/2006 |

OTHER PUBLICATIONS

3GPP, *3rd Generation Partnership Project; Technical Specification Group Radio Access Network; Physical Layer Aspects For Evolved Universal Terrestrial Radio Access (UTRA) (Release 7)*, 3GPP TR 25.814 V7.1.0 (Sep. 2006).

3GPP, *3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)*, 3GPP TS 36.300 V8.1.0 (Jun. 2007).

3GPP, *3rd Generation Partnership Project; Technical Specification Group Radio Access Network; Evolved Universal Terrestrial Radio Access Network (EUTRAN); X2 Application Protocol (X2AP)*, 3GPP TS 36.423 V0.1.0 (Jun. 2007).

3GPP, *3rd Generation Partnership Project; Technical Specification Group Radio Access Network; Physical Layer Aspects For Evolved Universal Terrestrial Radio Access (UTRA) (Release 7)*, 3GPP TR 25.814 V7.0.0 (Jun. 2006).

3GPP, *3rd Generation Partnership Project; Technical Specification Group Radio Access Network; Physical Layer Aspects For Evolved Universal Terrestrial Radio Access (UTRA) (Release 7)*, 3GPP TR 25.814 V7.1.0 (Sep. 2006).

3GPP, *3rd Generation Partnership Project; Technical Specification Group Radio Access Network; Evolved Universal Terrestrial Radio Access (E-UTRA) and Evolved Unicersal Terrestrial Radio Access Network (E-UTRAN); Overall description; Stage 2 (Release 8)*, 3GPP TS 36.300 V8.1.0 (Jun. 2007).

3GPP, *3rd Generation Partnership Project; Technical Specification Group Radio Access Network; Evolved Universal Terrestrial Radio Access (EUTRA); X2 Application Protocol (X2AP)*, 3GPP TS 36.423 V0.1.0 (Jun. 2007).

* cited by examiner

WIRELESS COMMUNICATION METHOD AND APPARATUS FOR ASSIGNING CELL AND RESOURCE BLOCKS

CROSS REFERENCE TO RELATED APPLICATION

This application claims the benefit of U.S. Provisional Application No. 60/844,428 filed Sep. 14, 2006, which is incorporated by reference as if fully set forth.

FIELD OF INVENTION

The invention is related to wireless communication systems. More particularly, resource and cell assignment for wireless communication systems with orthogonal uplink is disclosed.

BACKGROUND

Evolved universal terrestrial radio access (E-UTRA) is expected to use a multiple-access scheme known as single-carrier (SC) frequency division multiple access (SC-FDMA) on the uplink. With such a scheme, users connected to the same cell can completely avoid mutual interference by transmitting on different subcarriers and/or different timeslots, (or transmission timing intervals (TTIs)). In one typical way of operating the system, a user could be assigned a set of subcarriers on a long term basis, and be scheduled through fast signaling at different TTIs. A base station controls the allocation of resources for a cell or a set of cells. The base station can easily coordinate the transmissions of users connected to these cells to avoid mutual interference. However, a base station does not directly control the transmissions from users connected to other cells. If transmissions from these other-cell users are received at a significantly high level at the base station antennas, they create interference. Thus, performance in the cell suffers.

The inter-cell interference problem is particularly significant when a user is situated at a location such that its path losses to two (or more) cells controlled by different base stations are approximately the same. Such users are often referred to as "boundary users."

Boundary users create a more acute inter-cell interference problem because the received signal levels are approximately the same between the cell they are connected to (serving cell) and the cell(s) they are not connected to (i.e., non-serving cell(s)). Therefore, at the non-serving cell, the signal from a boundary user is likely to be relatively strong. Since the non-serving cell is not controlling the subcarriers and time of transmission from the boundary user, the likelihood of collision with other users is high. Thus, for these users, either more retransmissions are needed or the modulation/coding scheme must be more conservative, resulting in decreased throughput.

Figure 1:
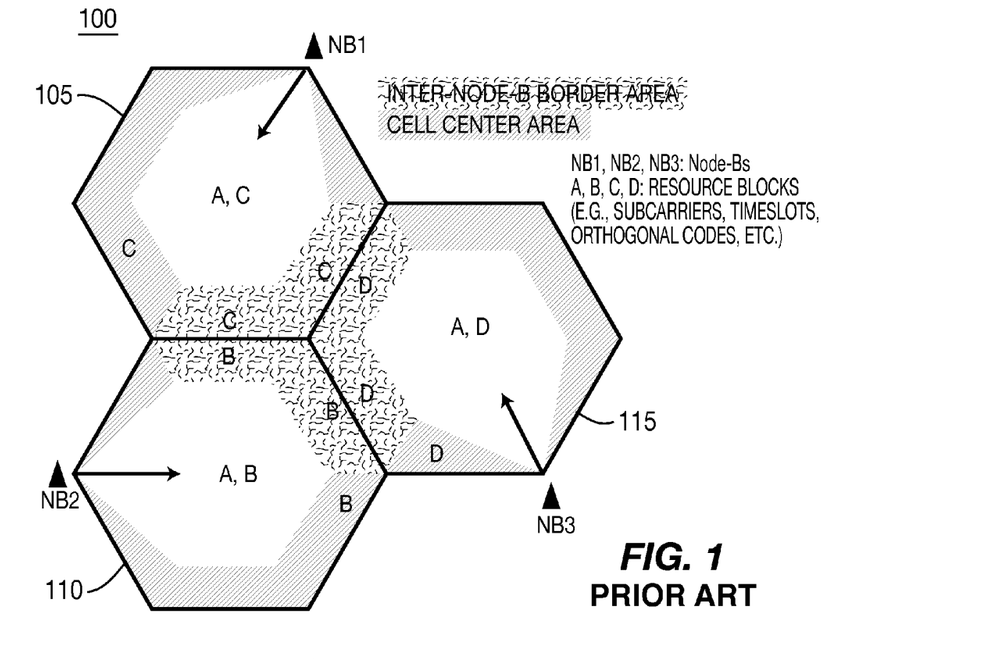
FIG. 1 shows a plurality of cells depicting a prior art segregation scheme to mitigate inter-cell interference.

FIG. 1 shows one conventional approach that is being used to segregate the set of resources that can be used in adjacent cells controlled by different Node-Bs NB1, NB2 and NB3 in a multi-cell wireless communication system 100. The Node-Bs NB1, NB2 and NB3 may be evolved Node-Bs (eNodeBs). The letters A, B, C and D shown in FIG. 1 represent areas of sectors 105, 110 and 115 of different cells, where blocks of resources, (e.g., subcarriers, timeslots, orthogonal codes, etc.), are available for users in the respective cell sectors. There are typically three sectors in a cell, only one of which is shown in FIG. 1 for each Node-B NB1, NB2 and NB3.

As shown in FIG. 1, resource block B can only be used in the cell sector 110 from NB2, resource block C can only be used in the cell sector 105 from NB1, and resource block D can only be used in the cell sector 115 from NB3. The arrows shown in FIG. 1 point in the direction of the main lobe of the antennas of the respective Node-Bs NB1, NB2 and NB3. Users that transmit on different resource blocks do not interfere with each other ("orthogonal" transmissions). For example, if the resource blocks consist of different sets of frequencies, the users transmitting on these different sets of frequencies do not interfere with each other.

Typically, a specific cell is first assigned to a user based on path loss considerations. A block of resources available in a particular sector of the specific cell is then assigned to the user based on path loss considerations.

This prior art approach prevents interference from boundary users because two users that are located within the inter-Node-B border area, but connected to different Node-Bs, are using different resource blocks, and hence do not interfere with each other. However, this approach incurs a severe penalty in terms of overall spectrum efficiency, since certain blocks of resources cannot be reused in every cell. Furthermore, this approach fails to exploit the intra-cell user orthogonality that is present with orthogonal FDMA (OFDMA) and SC-FDMA systems in particular, and does not result in the highest possible capacity. Because, as described above, certain resource blocks can only be used in specific cell sectors, the total number of users that can be served in the whole system for a given amount of resource blocks, (i.e., a given amount of spectrum), is less than what it could be if the resource blocks could be used in all sectors (or more sectors). Thus, the capacity is not as high as it could be.

It would therefore be beneficial if a resource and cell assignment method and apparatus existed that was not subject to the limitations of the existing prior art.

SUMMARY

A method and apparatus for assigning cell and resource blocks to a wireless transmit/receive units (WTRU) in a wireless communication system including a resource management unit and a plurality of cells having resource blocks are disclosed. The WTRU is currently associated with a particular one of the cells. Path losses between the WTRU and cells neighboring the particular cell are determined. The average level of inter-cell interference on each resource block at each cell neighboring the particular cell is then determined. A signal-to-interference ratio (SIR) is then determined to support a guaranteed bit rate of the WTRU on an uplink.

When signals from same-cell users are orthogonal in the uplink, such as in E-UTRA, (also known as long term evolution (LTE)), signaling and procedures for assigning a set of resources and a cell to a user are provided in such a way that optimizes system capacity, taking into account inter-cell interference issues.

BRIEF DESCRIPTION OF THE DRAWINGS

The foregoing summary, as well as the following detailed description, will be better understood when read with reference to the appended drawings, wherein.

DETAILED DESCRIPTION

Hereafter, a wireless transmit/receive unit (WTRU) includes but is not limited to a user equipment (UE), mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

In one embodiment, cell and resource block assignment decisions are jointly implemented to optimize capacity. The selection of the cell depends not only on the path losses to candidate cells, but also depends on other factors as will be explained below. Thus it is possible that the selected cell is not the one for which the path loss is the smallest. A "candidate" cell is a cell to which a user may potentially connect. For example, the selection of a candidate cell may take place either during a handover procedure or for initial access to a wireless communication system, (i.e., during initial cell selection), or during "cell reselection" during which the user is already connected to a cell in a "non-active" mode and connects to a new cell.

Figure 2:
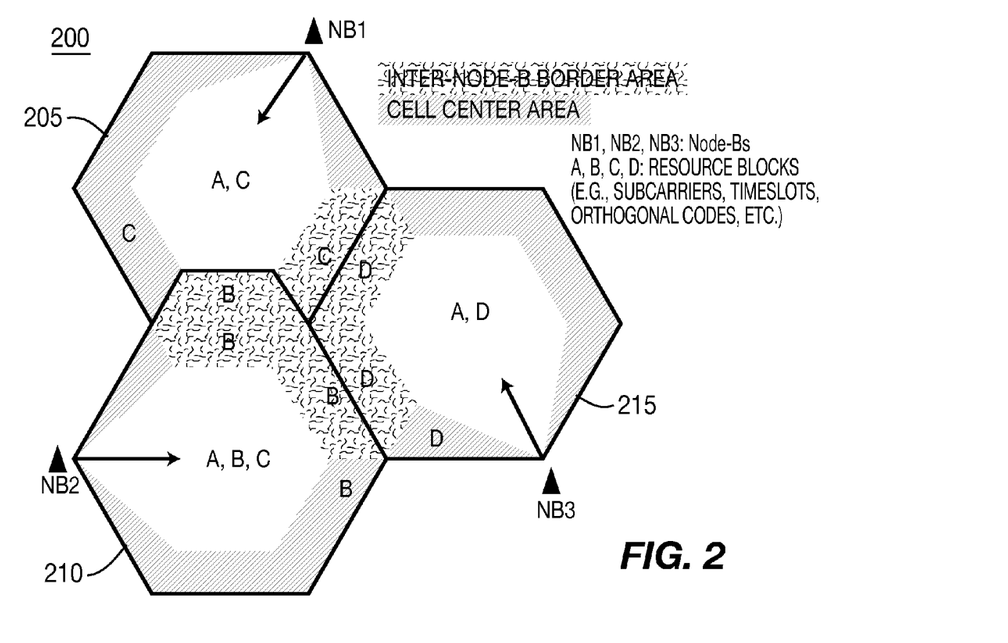
FIG. 2 shows a plurality of cells depicting an assignment of boundary users to a same Node-B allowing reuse of a block of resources in an extended cell.

FIG. 2 shows a multi-cell wireless communication system 200 comprising a plurality of adjacent cells 205, 210 and 215 controlled by different Node-Bs NB1, NB2 and NB3. FIG. 2 depicts the assignment of boundary users to a common Node-B, thus allowing reuse of a block of resources in an extended cell. FIG. 2 provides an example of how making joint cell and resource assignment decisions can improve capacity.

For illustration purposes only, in FIG. 2, the closest Node-B, (i.e., the Node-B that is at a minimum distance from the user), is also the one to which the path loss is the smallest. In practice, the closest Node-B is not necessarily the same as the Node-B to which the path loss is the smallest (because of shadowing). However, to simplify the graphical representation, it is assumed that this is the case. In this example, the users located within the border area between Node-Bs NB1 and NB2 are all connected to the same cell 210 and are assigned the same block of resources "B", regardless of which cell is actually the closest to the users in terms of path loss. In FIG. 2, the border of cell 210 is shown as extending into (i.e., penetrating) the border of cell 205. Thus, all of the users in the boundary area are assigned to the resource blocks "B". This presents the advantage that no user in cell 205 will generate significant interference on resource blocks "C". Thus, it is now possible for some users in cell 210 to use resource blocks "C".

Depending on the specific system and/or procedure used, this principle can be applied in methods used at the WTRU side, at the Node-B side or by a resource management unit as described in the paragraphs below. The decision of which cell (Node-B) a user should connect to depends not only on the path losses between this user and the different cells (as in prior art), but also on the levels of interference measured on the different resource blocks at the different Node-Bs.

One possible selection criterion for the generalized cell and resource assignment provided for the uplink is to select the cell and resource block that minimizes the expected increase of inter-cell interference in dB among all possible combinations of cell and resource block assignments, subject to constraints on the maximum transmission power of the terminal and on the maximum level of inter-cell interference on a resource block and cell. The rationale for utilizing this criterion is that the interference on a given resource block at a given cell cannot exceed a certain level if minimum coverage and/or throughput requirements are to be met for the users utilizing this cell and resource block. Thus, the increase of interference (or average interference) can be considered as a metric of capacity consumption that should be minimized for a given assignment.

Figure 3:
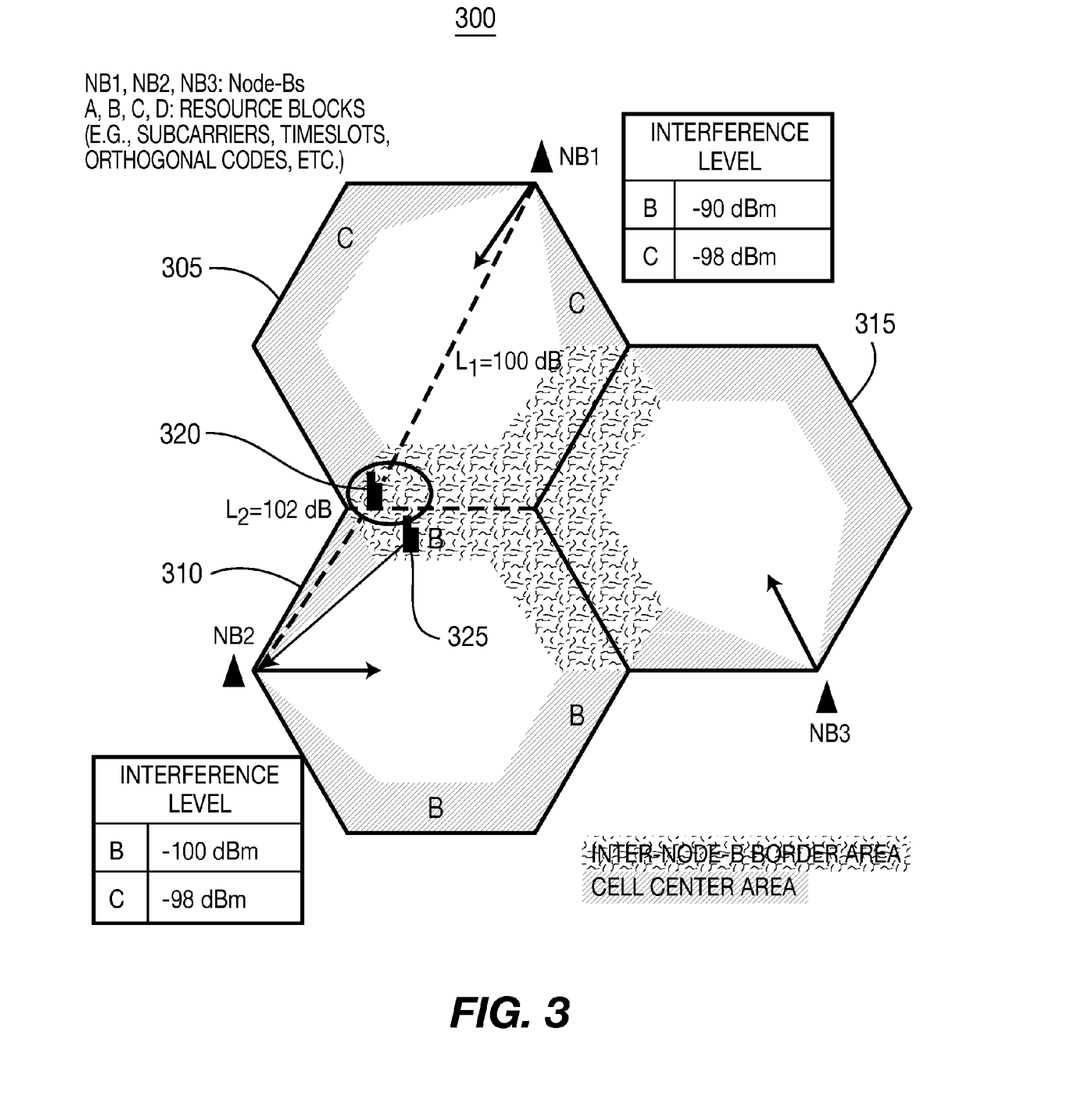
FIG. 3 shows a plurality of cells depicting interference levels at nodes prior to assignment of resources.

FIG. 3 shows a multi-cell wireless communication system 300 comprising a plurality of adjacent cells 305, 310 and 315 controlled by different Node-Bs NB1, NB2 and NB3. FIG. 3 shows an example of a scenario where a particular WTRU 320 needs to be assigned or re-assigned a cell and a resource block.

Referring to the example of FIG. 3, the cells 305 and 310 are served by Node-Bs NB1 and NB2. Cell 305 has a first set of candidate blocks of resources C and the cell 310 has a second set of candidate blocks of resources B that can potentially be assigned to the WTRU 320. A block of resources may refer to a set of subcarriers, (in a system using OFDMA or SC-FDMA), a set of timeslots, a set of orthogonal codes, (in a system using code division multiple access (CDMA)), or any combination thereof. In the example of FIG. 3, it is assumed that before a block of resources is assigned to the WTRU 320, and the level of inter-cell interference is low at both Node-Bs NB1 and NB2, except on resource block B at Node-B NB1, due to interference from another WTRU 325 that is connected to Node-B NB2. Block B is "associated" with NB2 in the sense that users connected to NB2 can transmit on block B, but the other Node-Bs experience inter-cell interference on block B due to these users that are connected to NB2 and transmit on block B.

In this context, there are four (4) options for resource assignment of the WTRU 320, depending on which block of resources and which cell is assigned to the WTRU 320. Such resource assignment may be triggered during a handover procedure, a cell reselection procedure, a procedure to select the cell to connect to for initial access, and the like. These options result in different outcomes in terms of the level of inter-cell interference at Node-Bs NB1 or NB2, as described in Table 1 below. Table 1 depicts possible assignments and resulting changes in inter-cell interference, assuming that the user needs an average signal-to-interference ratio (SIR) of 8 dB.

TABLE 1

| | Assignment | Required Tx Power | Expected change of inter-cell interference |
|---|---|---|---|
| 1 | To NB1, block B | 18 dBm | Increase from −100 dBm to −84 dBm at NB2, block B |
| 2 | To NB1, block C | 10 dBm | Increase from −98 dBm to −91 dBm at NB2, block C |
| 3 | To NB2, block B | 10 dBm | Increase from −90 dBm to −87 dBm at NB1, block B |
| 4 | To NB2, block C | 12 dBm | Increase from −98 dBm to −88 dBm at NB1, block C |

Assignment #3 minimizes the increase of inter-cell interference (in dB) and would therefore be selected according to the proposed criterion. Assignment #3 also corresponds to the approach of assigning the same Node-B and resource block to boundary users, since the other WTRU is already connected to Node-B NB2 on block B. Thus, this assignment would realize the approach shown in FIG. 2 that allows the eventual use of block C for users connected to the cell served by Node-B NB2.

The type of signaling required to support generalized cell/resource assignment depends on the architecture of the system and which node makes the allocation decision. Broadly speaking, two main possibilities can be envisioned. One is where the cell/resource assignment decision takes place in the network. The second is where the cell/resource assignment decision takes place in the terminal.

Figure 4:
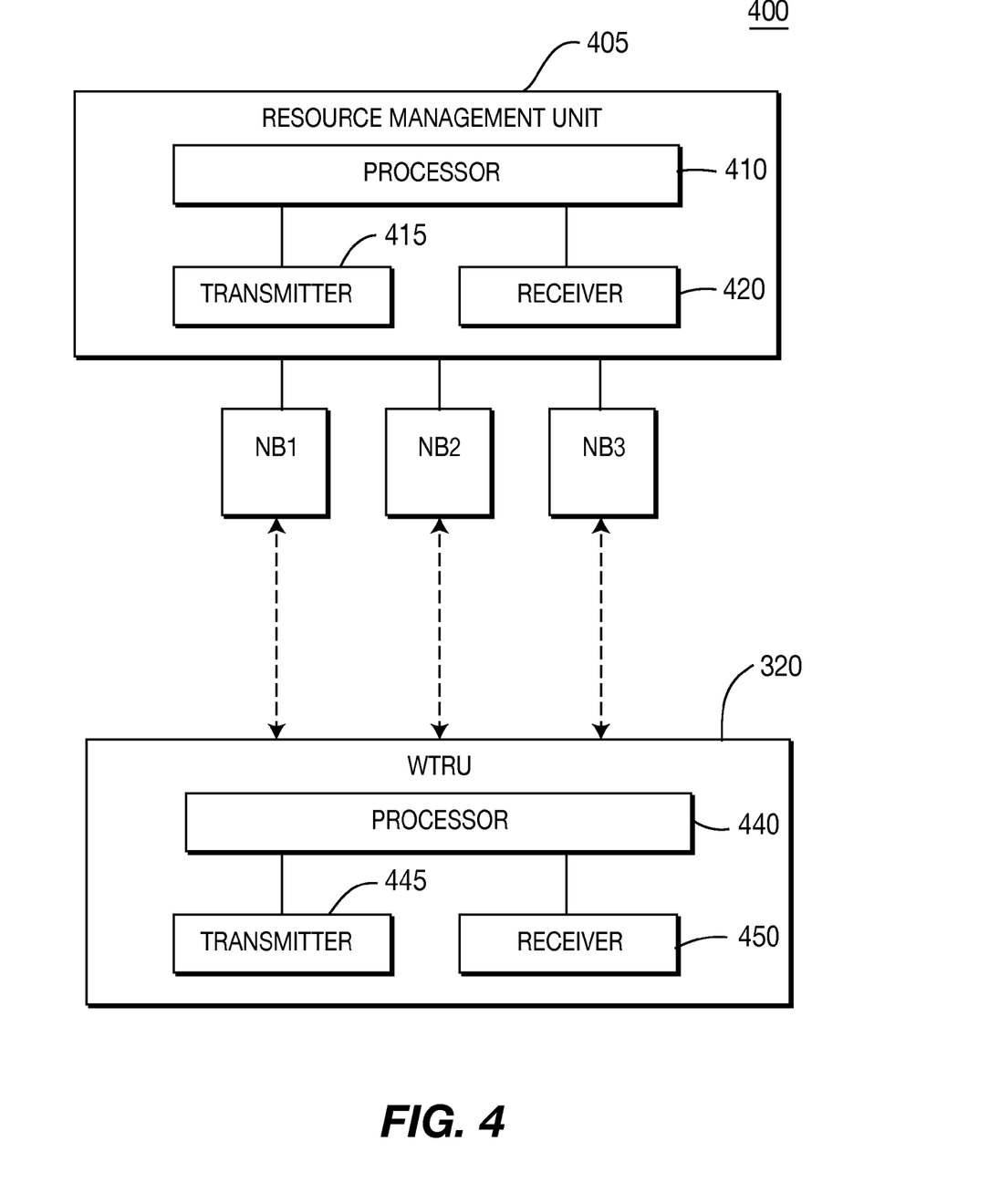
FIG. 4 shows a wireless communication including a resource management unit, a plurality of Node-Bs and a WTRU.

FIG. 4 shows a wireless communication system 400 including a resource management unit 405, a plurality of Node-Bs NB1, NB2 and NB3 and a WTRU 320.

In the network-based case, the resource management unit 400 is designated for the WTRU 320 at the time of resource assignment. The node within which the resource management unit 405 is located may be a specific base station that the WTRU previously contacted for initial access. Alternatively, as shown in FIG. 4, the node within which the resource management unit 405 is located may be a central node to which the set of candidate Node-Bs NB1, NB2 and NB3 are connected. In the latter case, it should be understood that any measurement reported by the WTRU 320 to the resource management unit 405, as well as any command sent from the resource management unit 405 to the WTRU 320, may be relayed by the Node-B to which the terminal is temporarily connected. Such measurement reporting may take place using any method known in the prior art.

As shown in FIG. 4, the resource management unit 405 includes a processor 410, a transmitter 415 and a receiver 420. The WTRU 320 includes a processor 440, a transmitter 445 and a receiver 450. The processor 410 in the resource management unit 405 is configured to estimate the amount of interference generated by the WTRU 320 for each candidate cell/resource assignment. To perform this estimation, the following information is needed:

1) path losses between the WTRU 320 and cells that neighbor a cell within which the WTRU operates;
2) average level of inter-cell interference on each resource block at each neighboring cell; and
3) required SIR to support a guaranteed bit rate.

Several possible methods exist for obtaining the set of path losses. First, the WTRU 320 may measure the received signal strength of a certain beacon signal transmitted by each cell at a known transmission power on a known resource block, and report this signal strength, (or an average thereof), to the resource management unit 405. Another possibility is that the WTRU 320 transmits a probe signal on a certain reserved resource block at a specified transmissions power and that neighboring cells measure the received signal strength of this probe signal, (or an average thereof). Neighboring cells then report the result of this measurement to the resource management unit 405.

The average level of inter-cell interference must be measured by the candidate cells on each resource block. The level of inter-cell interference measured at a particular cell (Node-B) depends on the resource block. For instance, if a resource block is a set of frequencies, the interference varies from one set of frequencies to another. Such measurements can be assumed to take place on a continuous basis by the candidate cells. This information may be relayed to the resource management unit 405 through the network infrastructure, either upon request or on a periodic basis.

The required SIR to support a guaranteed bit rate can be estimated by the resource management unit 405 based on the guaranteed bit rate of the user on the uplink. This guaranteed bit rate may be known from prior negotiations between the WTRU 320 and the core network and/or the core network and the resource management unit 405. The degree of accuracy to which the required SIR needs to be known is not very high since this value does not affect the ranking between the cells/resource blocks. This value is used to determine whether the maximum transmission power of the WTRU 320 would be exceeded, or if the maximum level of inter-cell interference on the candidate cell/resource block would be exceeded.

Based on the collected information, the processor 410 in the resource management unit 405 can determine the expected increase of inter-cell interference on resource blocks at neighboring cells for each candidate cell and resource block assignment. The simplest way of making this calculation for each candidate assignment is as follows. First, estimate the required transmission power (TxPower) of the WTRU 320 based on the required SIR, the average level of inter-cell interference on the candidate cell and resource block ($I_{cand}$) and the path loss to the candidate cell ($L_{cand}$) based on the following formula:

$$\text{TxPower(dBm)} = \text{SIR(dB)} + L_{cand}(\text{dB}) + I_{cand}(\text{dBm}). \qquad \text{Equation (1)}$$

Second, calculate the resulting level of inter-cell interference ($\Delta I_i$) generated by the user at each neighboring cell (i) and resource block (j) based on the required transmission power and the path loss between the WTRU 320 and the neighboring cell ($L_i$):

$$\Delta I_i(\text{dBm}) = \text{TxPower(dBm)} - L_i(\text{dB}). \qquad \text{Equation (2)}$$

Third, estimate the relative increase of inter-cell interference ($I_{ij}'/I_{ij}$) on each resource block at each cell based on the pre-existing level of inter-cell interference:

$$(I_{ij}'/I_{ij})(\text{dB}) = 10 \log 10[1 + \Delta I_i(\text{mW})/L_{ij}(\text{mW})]. \qquad \text{Equation (3)}$$

The above calculation is only an example, and it is also possible to use more sophisticated methods to account for further interference increases due to power balancing effects after the user has started transmitting.

After the processor 410 in the resource management unit 405 has estimated the set of estimated relative increases of inter-cell interference for each candidate cell and resource block assignment, an elected assignment is determined based on one of the following criteria:

1) smallest sum of estimated relative increases of inter-cell interference (in dB or in linear);
2) smallest maximum among the estimated relative increases of inter-cell interference; and
3) smallest weighted sum of estimated relative increases of inter-cell interference (in dB or in linear). The weights can be cell- and/or resource block-dependent if certain cells or resources are considered more important by the resource management unit 405.

Once the candidate assignment has been determined, the resource management unit 405 may initiate a handover procedure to have the WTRU 320 connect to the elected cell in case this cell is different from the one it is currently connected to. The resource management unit 405 should be free to not execute such a handover procedure if the elected cell is not optimal for downlink transmission purposes and if the uplink cell has to be the same as the downlink cell. In such a situation where the assignment is constrained to be within a certain cell or set of cells, the resource management unit 405 can elect the best assignment, (according to the chosen criterion), within this set of cells.

When instructing the WTRU 320 about the cell and resource block it should use, the resource management unit 405 may also specify a maximum bit rate or a maximum transmission power that the WTRU 320 can use, in order to limit the inter-cell interference the WTRU 320 generates.

In the terminal-based case, the entity making the decision about the assignment is in the processor 440 in the WTRU 320. The processor 440 in the WTRU 320 can make this decision according to the same criteria as in the network-based case (with similar calculations), but the information that needs to be signaled is different.

The set of path losses between the WTRU 320 and the neighboring cells does not need to be signaled if the WTRU 320 makes the measurements itself, which is the most efficient solution. If the measurements were made by the base stations using the probe signal method described in the previous section, these measurements would need to be signaled to the WTRU 320.

The inter-cell interference levels on each resource block and cell cannot be measured by the WTRU 320 and must be signaled. Several possibilities exist for this. First, the transmitter 445 in the WTRU 320 may send a request to the resource management unit 405 in the network for the interference levels of specified resource blocks at specified neighboring cells. Another possibility is that the neighboring cells periodically broadcast their average inter-cell interference levels on each resource block. The receiver 450 in a WTRU 320 considering a connection to a certain cell would therefore listen for these broadcasted signals, such that the processor 440 may determine inter-cell interference levels. Optionally, the neighboring cells could also broadcast the maximum level of average interference they can tolerate on each resource block, and/or the maximum increase of average interference they can tolerate on each resource block.

The required SIR to support the guaranteed bit rate of the WTRU 320 could be estimated autonomously by the processor 440 in the WTRU 320. Alternatively, the required SIR may be signaled by the resource management unit 405 to the receiver 450 of the WTRU 320 to minimize signaling overhead.

Once the processor 440 in the WTRU 320 has determined the optimal cell and resource block assignment, (based on the same type of calculations as outlined above for the network-based case), several possibilities exist to execute the assignment. The first possibility is that the transmitter 445 of the WTRU 320 notifies the resource management unit 405 of its elected assignment. The resource management unit 405 then proceeds with a handover procedure as in the network-based case. The resource management unit 405 may also deny the request from the WTRU 320 if for whatever reason the requested assignment is deemed not suitable. The resource management unit 405 may also accept the request under condition that the WTRU 320 does not transmit above a certain bit rate or transmission power similarly to the network-based case.

The second possibility is that the WTRU 320 directly contacts the elected cell on a special channel to request the use of the elected resource block. Upon receipt of the request, the cell could either accept (possibly conditionally as above) or deny the request and signal its response to the WTRU 320. This scenario is most suitable in the case where there is no central node that makes resource management decisions.

Although the features and elements are described in the embodiments in particular combinations, each feature or element can be used alone without the other features and elements of the preferred embodiments or in various combinations with or without other features and elements of the invention. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of assigning a cell and resource blocks to a wireless transmit/receive unit, WTRU, the method comprising:

determining a current cell and a resource block that a WTRU is allocated to;

determining path losses between the WTRU and cells neighboring the current cell;

determining an expected change of inter-cell interference generated based on the WTRU being allocated to each neighboring cell and resource block among all possible candidate cell and resource block combinations, subject to the constraint of a predetermined power of the WTRU and a predetermined level of cell interference;

assigning the WTRU to the candidate cell with the resource block having the lowest expected change of intercell interference required to support a predetermined bit rate of the WTRU on an uplink based on the predetermined power of the WTRU and the predetermined level of cell interference;

estimating the required transmission power, TxPower, of the WTRU based on a required signal-to-interference ratio, SIR, the average level of inter-cell interference on the candidate cell and resource block, $I_{cand}$, and the path loss to the candidate cell, $L_{cand}$, based on the following formula:

TxPower(dBm)=SIR(dB)+$L_{cand}$(dB)+$I_{cand}$(dBm), calculating the resulting level of inter-cell interference, $\Delta I_i$, generated by the WTRU at each neighboring cell, i, and resource block, j, based on the required transmission power and the path loss between the WTRU and the neighboring cell $L_i$:

$\Delta I_i$(dBm)=TxPower(dBm)−$L_i$(dB), estimating the relative increase of inter-cell interference, $I_{ij}'/I_{ij}$, on each resource block at each cell based on the pre-existing level of inter-cell interference:

$I_{ij}'/I_{ij}$(dB)=10 log 10[1+$\Delta I_i$(mW)/$I_{ij}$(mW)].

2. The method of claim 1 further comprising:
measuring the received signal strength of a certain beacon signal transmitted by each of the cells at a known transmission power on a known resource block; and
reporting the received signal strength to a resource management unit.

3. The method of claim 2 wherein an average received signal strength is reported to the resource management unit.

4. The method of claim 1 further comprising:
transmitting a probe signal on a certain reserved resource block at a specified transmission power.

5. The method of claim 4 further comprising:
receiving measurements of the received signal strength of the probe signal.

6. The method of claim 1 further comprising:
measuring the average level of inter-cell interference by candidate cells on each resource block.

7. The method of claim 6 wherein the measurement of the average level of inter-cell interference is performed upon request.

8. The method of claim 6 wherein the measurement of the average level of inter-cell interference is performed on a periodic basis.

9. The method of claim 1 further comprising:
determining, based on a signal-to-interference ratio, SIR, whether a maximum transmission power of the WTRU would be exceeded, or if a maximum level of inter-cell interference on a candidate cell/resource block would be exceeded.

10. The method of claim 1 further comprising:
determining an expected increase of inter-cell interference on resource blocks at neighboring cells for each candidate cell assignment.

11. The method of claim 1 wherein after the set of estimated relative increases of inter-cell interference has been estimated for each candidate cell and resource block assignment, an elected assignment is determined based on the smallest sum of estimated relative increases of inter-cell interference.

12. The method of claim 1 wherein after the set of estimated relative increases of inter-cell interference has been estimated for each candidate cell and resource block assignment, an elected assignment is determined based on the smallest maximum among the estimated relative increases of inter-cell interference.

13. The method of claim 1 wherein after the set of estimated relative increases of inter-cell interference has been estimated for each candidate cell and resource block assignment, an elected assignment is determined based on the smallest weighted sum of estimated relative increases of inter-cell interference.

14. A resource management unit for managing a plurality of cells and resource blocks, the resource management unit comprising:
a receiver configured to receive information used to i) determine a current cell and a resource block that a wireless transmit/receive unit, WTRU, is allocated to, and ii) determine path losses between the WTRU and cells neighboring the current cell and
a processor configured to determine an expected change of inter-cell interference generated based on a wireless transmit/receive unit, WTRU, being allocated to each neighboring cell and resource block among all possible candidate cell and resource block combinations, subject to the constraint of a predetermined power of the WTRU and a predetermined level of cell interference, and assign the WTRU to the candidate cell with the resource block having the lowest expected change of intercell interference required to support a predetermined bit rate of the WTRU on an uplink based on the predetermined power of the WTRU and the predetermined level of cell interference;
wherein the processor estimates the required transmission power, TxPower, of the WTRU based on a required signal-to-interference ratio, SIR, the average level of inter-cell interference on the candidate cell and resource block, $I_{cand}$, and the path loss to the candidate cell, $L_{cand}$, based on the following formula:

TxPower(dBm)=SIR(dB)+$L_{cand}$(dB)+$I_{cand}$(dBm), wherein the processor calculates the resulting level of inter-cell interference, $\Delta I_i$, generated by the WTRU at each neighboring cell, i, and resource block, j, based on the required transmission power and the path loss between the WTRU and the neighboring cell, $L_i$:

$\Delta I_i$(dBm)=TxPower(dBm)−$L_i$(dB), wherein the processor estimates the relative increase of inter-cell interference, $I_{ij}'/I_{ij}$, on each resource block at each cell based on the pre-existing level of inter-cell interference:

$I_{ij}'/I_{ij}$(dB)=10 log 10[1+$\Delta I_{ij}$(mW)/$I_{ij}$(mW)].

15. The resource management unit of claim 14 wherein the receiver is further configured to receive a signal from the WTRU indicating an average received signal strength measurement.

16. The resource management unit of claim 14 wherein the receiver is further configured to receive signals from the neighboring cells indicating received signal strength measurements.

17. The resource management unit of claim 16 wherein the neighboring cells report an average received signal strength.

18. The resource management unit of claim 14 wherein the average level of inter-cell interference by the candidate cells on each resource block is measured.

19. The resource management unit of claim 18 wherein the measurement of the average level of inter-cell interference is performed upon request.

20. The resource management unit of claim 18 wherein the measurement of the average level of inter-cell interference is performed on a periodic basis.

21. The resource management unit of claim 14 wherein the processor determines whether the maximum transmission power of the WTRU would be exceeded, or if the maximum level of inter-cell interference on a candidate cell/resource block would be exceeded, based on a signal-to-interference ratio, SIR, estimate.

22. The resource management unit of claim 14 wherein the processor determines an expected increase of inter-cell interference on resource blocks at neighboring cells for each candidate cell assignment.

23. The resource management unit of claim 14 wherein after the resource management unit has estimated the set of estimated relative increases of inter-cell interference for each candidate assignment, the assignment being determined based on the smallest sum of estimated relative increases of inter-cell interference.

24. The resource management unit of claim 14 wherein after the resource management unit has estimated the set of estimated relative increases of inter-cell interference for each candidate cell and resource block assignment, an elected assignment is determined based on the smallest maximum among the estimated relative increases of inter-cell interference.

25. The resource management unit of claim 14 wherein after the resource management unit has estimated the set of estimated relative increases of inter-cell interference for each candidate cell and resource block assignment, an elected assignment is determined based on the smallest weighted sum of estimated relative increases of inter-cell interference.

26. A wireless transmit/receive unit, WTRU, comprising:
a receiver configured to receive information used to i) determine a current cell and a resource block that a wireless transmit/receive unit, WTRU, is allocated to, and ii) determine path losses between the WTRU and cells neighboring the current cell; and
a processor configured to determine an expected change of inter-cell interference generated based on the WTRU being allocated to each neighboring cell and resource block among all possible candidate cell and resource block combinations, subject to the constraint of a predetermined power of the WTRU and a predetermined level of cell interference, and assign the WTRU to the candidate cell with the resource block having the lowest expected change of intercell interference required to support a predetermined bit rate of the WTRU on an uplink based on the predetermined power of the WTRU and the predetermined level of cell interference;
wherein the processor estimates the required transmission power, TxPower, of the WTRU based on a required signal-to-interference ratio, SIR, the average level of inter-cell interference on the candidate cell and resource block, $I_{cand}$, and the path loss to the candidate cell, $L_{cand}$, based on the following formula:

$$\text{TxPower(dBm)} = \text{SIR(dB)} + L_{cand}(\text{dB}) + I_{cand}(\text{dBm}),$$

wherein the processor calculates the resulting level of inter-cell interference, $\Delta I_i$, generated by the WTRU at each neighboring cell, i, and resource block, j, based on the required transmission power and the path loss between the WTRU and the neighboring cell, $L_i$:

$$\Delta I_i(\text{dBm}) = \text{TxPower(dBm)} - L_i(\text{dB}),$$

wherein the processor estimates the relative increase of inter-cell interference, $I_{ij}'/I_{ij}$, on each resource block at each cell based on the pre-existing level of inter-cell interference:

$$I_{ij}'/I_{ij}(\text{dB}) = 10 \log 10[1 + \Delta I_i(\text{mW})/I_{ij}(\text{mW})].$$

27. The WTRU of claim 26 further comprising:
a transmitter configured to transmit a signal indicating an average received signal strength.

28. The WTRU of claim 26 further comprising:
a transmitter configured to request interference levels of specified resource blocks at specified neighboring cells from a resource management unit.

29. The WTRU of claim 26 wherein the received information further includes a maximum bit rate or a maximum transmission power that the WTRU should use to limit inter-cell interference that the WTRU generates.

* * * * *